Nov. 15, 1932.  R. W. REGENSBURGER  1,887,516
MEANS FOR SEPARATING AND PACKING EGGS
Filed Feb. 24, 1931  3 Sheets-Sheet 1

Witness—
H. C. Meiser

Richard W. Regensburger,
INVENTOR
BY George W. Johns,
ATTORNEY

Nov. 15, 1932.  R. W. REGENSBURGER  1,887,516
MEANS FOR SEPARATING AND PACKING EGGS
Filed Feb. 24, 1931   3 Sheets-Sheet 2

Nov. 15, 1932.  R. W. REGENSBURGER  1,887,516
MEANS FOR SEPARATING AND PACKING EGGS
Filed Feb. 24, 1931   3 Sheets-Sheet 3

Patented Nov. 15, 1932

1,887,516

UNITED STATES PATENT OFFICE

RICHARD W. REGENSBURGER, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

MEANS FOR SEPARATING AND PACKING EGGS

Application filed February 24, 1931. Serial No. 517,780.

My invention relates to a novel method of separating the whites from the yolks of eggs and for packing such whites and yolks after separating, and the means for carrying out the method.

One of the objects of my invention is to specialize the several operations in a commercial egg breaking room to permit greater efficiency in the work of the several operators.

Another object of my invention is to provide a method whereby eggs may be economically and efficiently broken out and separated on a commercial scale.

Another object of my invention is to provide a novel layout for an egg breaking and packing unit.

Another object of my invention is to provide an efficient combination of conveying means, breaking tables and separating means.

Other objects of my invention will be apparent from the description which follows.

Referring now to the drawings, which are made a part of this specification and in which similar characters of reference signify identical parts in the several figures.

Figure 1:
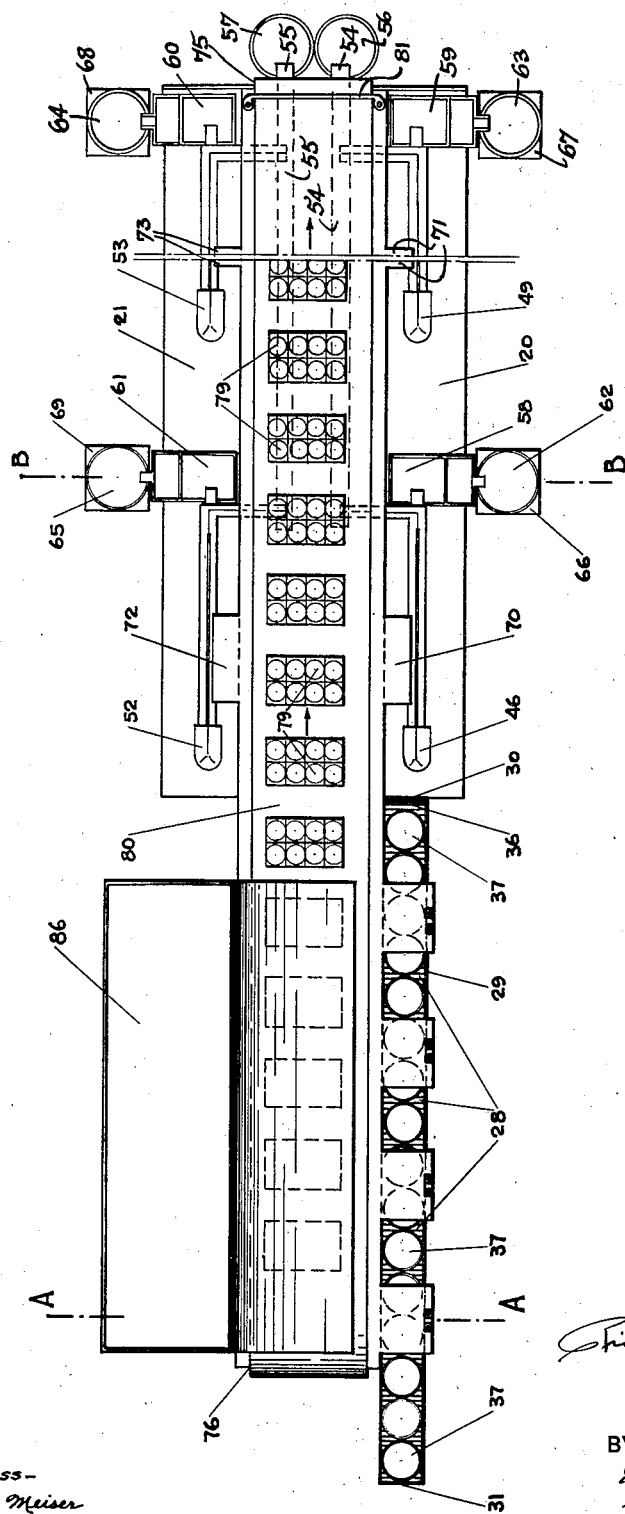
Figure 1 is a plane view of one embodiment of my invention.

In the particular embodiment of my invention shown in the drawings, an appropriate angle iron framework supports the mechanism.

In the drawings will be noted legs 1, 2, 3, 4, 5, 6, 7, 8, 9, 10, 11, 12 and 13, which act primarily as support for the conveyor mechanism, and also support other appurtenances, as will be explained more particularly in detail.

Rigidly affixed to the top of the several legs which have already been mentioned are angle irons 14 and 15. It will be noted that bracers, as 16 and 17, extend only to the legs on each side of the framework. Bracers 18 and 19 are carried beyond the legs on each side to serve as the end supports for platforms 20 and 21. Platform 20 is supported in addition by the side angle 22 and legs 23 and 24. Platform 21 is similarly supported by side angle 25 and legs 26 and 27.

A roller conveyor 28 is supported by side angle 29 and end angles 30 and 31, which are supported by braces 32 and 33. Roller conveyor 28 consists of the members already mentioned together with a plurality of metal rollers such as 34, which are rotatably mounted to side angle 29 and side angle 35. Roller conveyor 28 is so mounted that the end 31 is higher than the end 30. Consequently, heavy objects placed upon the rollers will slide down toward end 30, where further motion is stopped by plate 36.

The eggs to be broken out are put in pails, as 37. Pails are placed upon the roller conveyor 28, which is filled up with pails of eggs. It will be noted that egg breaker's platforms 38, 30, 40 and 41 are equipped with egg breakers 42, 43, 44 and 45. It will be noted that the egg breakers are more particularly described and claimed in my co-pending application for United States patent for improvement in egg breaker, filed February 18, 1931, Serial No. 516,631.

Egg separating slide 46 is mounted on platform 20 by appropriate supports, such as 47 and 48. Egg separating slide 49 is mounted on platform 20 by appropriate supports such as 50 and 51. Egg separating devices 52 and 53 are similarly appropriately mounted on platform 21.

I prefer to use the egg separating slides of the type more particularly described and claimed in the co-pending application for United States patent made by Charles T. Walter and myself, entitled Methods and means for separating the whites from the yolks of eggs, Serial No. 491,132, filed October 25, 1930, or, more preferably, the improvement therein described and claimed in my co-pending application for United States patent, entitled Egg separator, Serial No. 521,904, filed March 12, 1931.

It will be noted that the upper or yolk slide of the several separating devices are adjusted to discharge into troughs 54 and 55, leading to containers 56 and 57. The lower or egg white trough of the separating devices discharge into appropriate traps, such as 58, 59, 60 and 61. The trap shown is of the type more particularly described in my co-pending application for United States patent, entitled Method and means for separating egg whites. Serial No. 512,402, filed January 30, 1931, although the trap described and claimed by Clinton Henry Parsons in his co-pending application for United States patent owned by the assignee of this application on improvements in egg separator, Serial No. 480,861, filed September 10, 1930, may be substituted if desired. The traps discharge into containers, as 62, 63, 64 and 65, appropriately mounted on blocks 66, 67, 68 and 69.

Egg separators' platforms 70 and 71 are rigidly affixed to side angle 14. Egg separators' platforms 72 and 73 are rigidly affixed to side angle 15.

Belt conveyor 74 revolves upon cylinders 75 and 76, which are respectively mounted upon shafts 77 and 78, which are rotatably mounted to the framework.

Plurality of trays 79 are shown on upper level 80 of the conveyor belt which travels in the direction of the arrow. To avoid trays falling off at the end, retaining bar 81 is provided.

Plurality of trays as 82 are shown on the lower level 83 of the conveyor, stop bar 84 being provided at the end to prevent the trays from coming in contact with cylinder 76.

The hood 85, consisting preferably of sheet metal, is provided to protect the trays on level 80 from egg shells cast over into receptacle 86 by the egg breakers.

Egg trays are shown with a plurality of eggs as 87. It will be noted that the trays and cups shown in the drawings are more particularly described and claimed in the co-pending application of Anson W. DeVout and myself, entitled Egg tray filed February 24, 1931, Serial No. 517,781.

Figure 2:
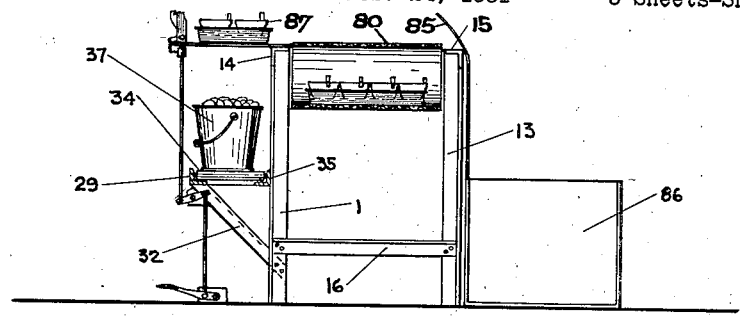
Figure 2 is a sectional view through an egg breaker's station, as A—A of Figure 1.
Figure 5:
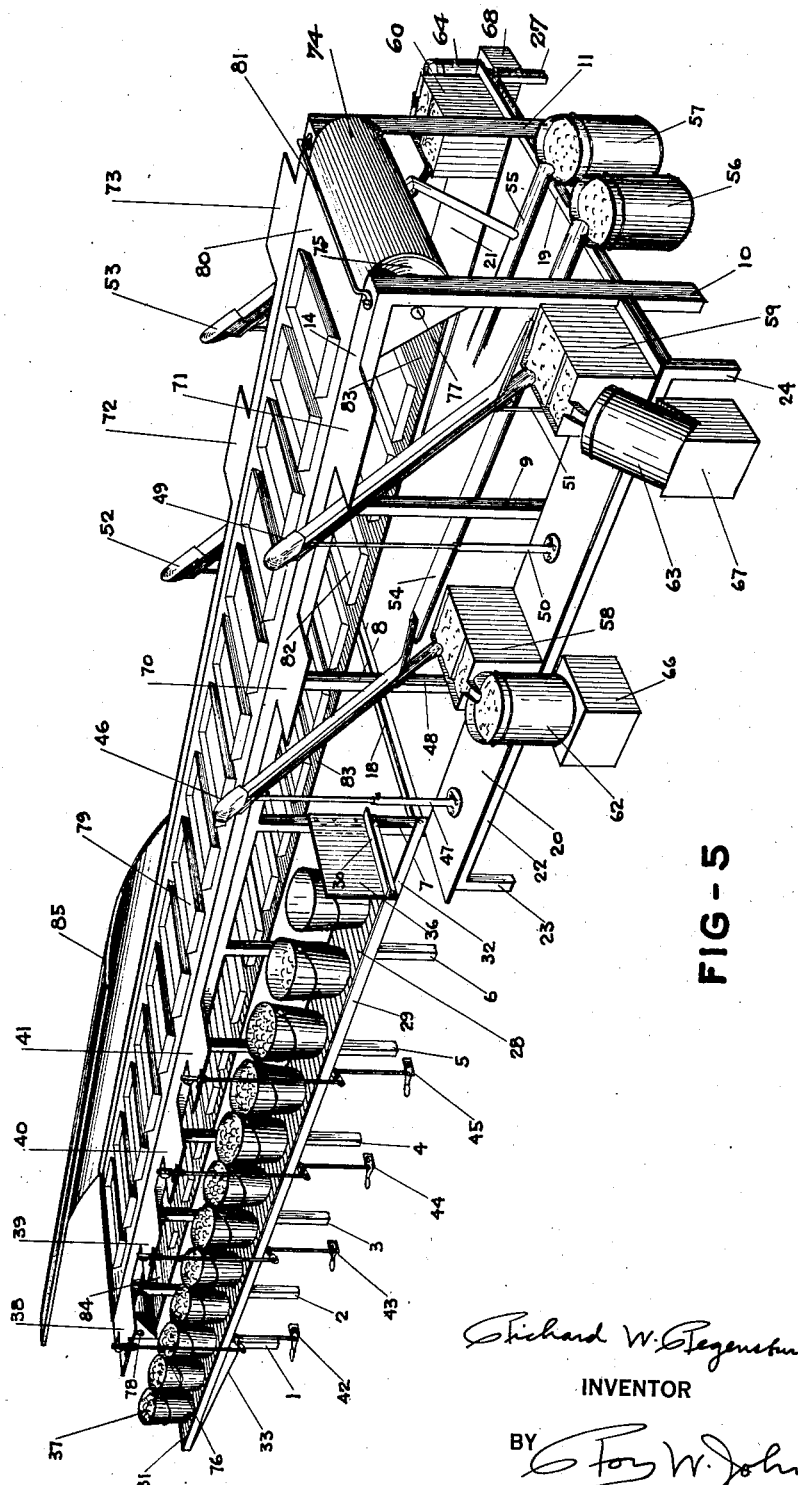
Figure 5 is a perspective view of the set-up shown in the plane in Figure 1.

In working, pails of eggs are placed upon roller conveyor 28, as is clearly shown in Figure 5. Egg breakers are stationed at each of the egg breakers' platforms. The breakers reach into the nearest pail, remove an egg, break it on the breaker and permit the contents of the broken egg to fall into one of the cups in the tray resting upon the platform, as shown in Figure 2. The shell is discarded by casting it over hood 85, falling into container 86. It will be noted that hood 85 is so positioned as to compel the operator to raise her hands high enough to permit complete drainage of the shell.

Figure 3:
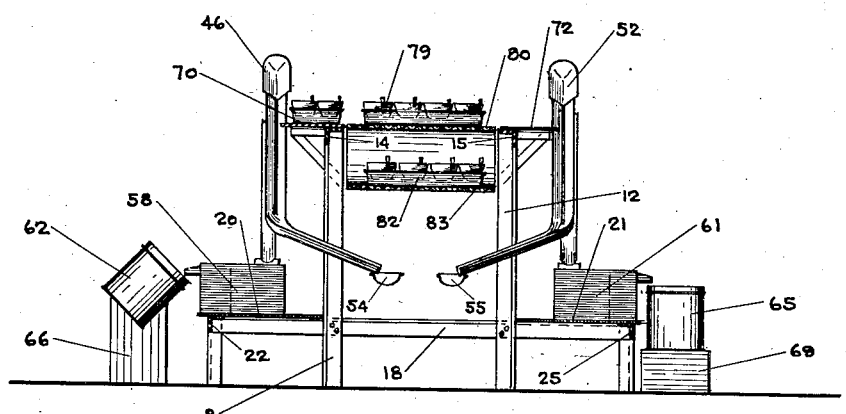
Figure 3 is a sectional view partly in perspective, through B—B of Figure 1.
Figure 4:
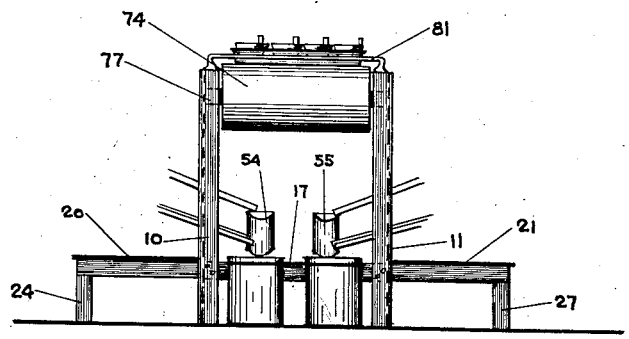
Figure 4 is an end view at the discharge end of Figure 1.

After all the cups in one tray have been filled by the placing of the contents of one egg in each cup, the egg breaker places the tray upon the top level 80 of the conveyor, whereby the tray is conveyed in the direction of the separators. An operator is stationed at each of the egg separating slides. An operator at one of these stations removes a tray containing ordinarily from six to eight full egg cups and places it upon the adjacent platform, as upon platform 70, as shown in Figure 3. The operator lifts the cups preferably one in each hand and smells the contents of one cup. If the egg is in good condition, as indicated by visual and olfactory inspection, it is dumped into the separator. While one egg is being dumped, the cup in the other hand is smelled. The yolks pass down the upper slide into the appropriate traps, to be discharged into containers 56 and 57. The whites pass down the lower trough of the separator into the appropriate traps and thence into the appropriate white containers. It will be noted that container 62 is in an upright position, whereas container 63 is held at a slant by the construction of block 67. I prefer to hold the cans at a slant until they become partially full, keeping the spillway of the trap in contact with the slide of the can in order to prevent any appreciable fall of the egg whites into the can, inasmuch as falling of the egg whites causes the entrapment of air bubbles and consequent enclouding of the product. When the operator at one of the separating stations has disposed of all the eggs in the one tray, tray containing the empty cups is placed upon the lower level 83 of the conveyor, to be carried back to the breakers' stations for re-use. It will be noted that the construction of roller conveyor 28 is such as to always keep a supply of eggs on hand for the breakers. When a can becomes empty, it is removed to be filled, the next can sliding up to take its place.

My method and the use of the device which I have described permits the egg breakers to specialize in breaking and the separators to specialize in separating. It has been found in practice that greater efficiency is secured with specialized operators. My invention permits such specialization.

Modifications of my invention may suggest themselves to persons skilled in the art, but it is understood that changes may be made in the design of the mechanism shown or in the method of using it without departing from the spirit of my invention as described in the following claim.

I claim:

A device for separating yolks from the whites of eggs, comprising a framework, an endless belt conveyor disposed in the horizontal plane, both levels being accessible, the upper level being adapted to convey loaded egg cup trays and the lower level being adapted to return empty egg cup trays, said framework being provided at one end with a plurality of egg breaking stations, each of said egg breaking stations comprising a tray rest adjacent the upper level of the conveyor and means associated therewith, for opening the shells of eggs, an open front hood above the upper level of the conveyor at the breaking station end of the device, an inclined roller conveyor adjacent the breakers' stations for delivery of whole eggs to operators at said breakers' stations, said inclined roller conveyor being secured to said framework and disposed sufficiently below the lower level of said conveyor to permit free access to said lower conveyor, a plurality of separating stations at the other end of said device, each of said separating stations comprising a tray rest adjacent the upper level of said conveyor and separating means at each of said separating stations.

Signed at Chicago, Illinois, this 19th day of February, 1931.

RICHARD W. REGENSBURGER.